US009810327B2

(12) United States Patent
Shima et al.

(10) Patent No.: US 9,810,327 B2
(45) Date of Patent: Nov. 7, 2017

(54) PRESSURE REDUCING VALVE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Toshihiko Shima, Okazaki (JP); Takashi Iwaguchi, Nagoya (JP); Hidetoshi Fujiwara, Nukata-gun (JP); Munetoshi Kuroyanagi, Nukata-gun (JP); Toshikatsu Kubo, Obu (JP); Eiji Okawachi, Toyota (JP); Masaaki Kondo, Owariasahi (JP); Akira Yamashita, Toyota (JP); Hidetsugu Hayashi, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/921,226

(22) Filed: Oct. 23, 2015

(65) Prior Publication Data
US 2016/0118676 A1    Apr. 28, 2016

(30) Foreign Application Priority Data
Oct. 27, 2014    (JP) .................................. 2014-218497

(51) Int. Cl.
*F16K 1/42*    (2006.01)
*F16K 27/04*    (2006.01)
(Continued)

(52) U.S. Cl.
CPC ................ *F16K 1/42* (2013.01); *F16K 27/04* (2013.01); *G05D 16/10* (2013.01); *G05D 16/02* (2013.01); *H01M 8/00* (2013.01)

(58) Field of Classification Search
CPC ........... F16K 1/42; F16K 27/04; G05D 16/02; G05D 16/10; G05D 16/103; G05D 16/106;
(Continued)

(56) References Cited

U.S. PATENT DOCUMENTS 3,415,427 A * 12/1968 Sharp ..................... B22D 41/16
222/591
2008/0105309 A1 * 5/2008 Kuroyanagi ........ F16K 31/1221
137/505.41
(Continued)

FOREIGN PATENT DOCUMENTS

CA      2 867 104 A1    9/2013
EP      2 131 091 A1    12/2009
(Continued)

OTHER PUBLICATIONS

May 4, 2016 Extended Search Report issued in European Patent Application No. EP15191477.7.

*Primary Examiner* — Mary McManmon
*Assistant Examiner* — Richard K. Durden
(74) *Attorney, Agent, or Firm* — Oliff PLC

(57) ABSTRACT

A valve element of a pressure reducing valve includes a taper portion seated on an inner periphery of a valve hole that includes a first area, a second area and a third area in order from an upstream side. The first area is provided such that, when the valve element is open, the height of a passage defined between the first area and the taper portion gradually reduces toward a downstream side. The second area is provided such that the height of a passage defined between the second area and the taper portion is constant when the valve element is open and the entire second area contacts the taper portion when the valve element is closed. The third area is provided such that, when the valve element is open,
(Continued)

the height of a passage defined between the third area and the taper portion gradually increases toward the downstream side.

3 Claims, 5 Drawing Sheets

(51) Int. Cl.
    *G05D 16/10*     (2006.01)
    *G05D 16/02*     (2006.01)
    *H01M 8/00*     (2016.01)

(58) Field of Classification Search
    CPC ......... Y10T 137/7822; Y10T 137/7823; Y10T 137/7825; Y10T 137/7826; Y10T 137/87265
    USPC ................................. 251/121, 122, 123, 333
    See application file for complete search history.

(56) References Cited

U.S. PATENT DOCUMENTS

| | | | | |
|---|---|---|---|---|
| 2008/0202603 | A1* | 8/2008 | Shima | G05D 16/10 137/505.11 |
| 2009/0308465 | A1* | 12/2009 | Suzuki | F16K 27/0254 137/317 |
| 2011/0114867 | A1* | 5/2011 | Suzuki | G05D 16/10 251/324 |
| 2014/0158237 | A1* | 6/2014 | Haneda | F16K 51/00 137/599.01 |
| 2015/0013787 | A1 | 1/2015 | Nakamura et al. | |

FOREIGN PATENT DOCUMENTS

| | | | |
|---|---|---|---|
| EP | 2 741 163 A2 | 6/2014 | |
| JP | 2013-196053 A | 9/2013 | |
| JP | 2013-254253 A | 12/2013 | |
| PL | 158724 B1 * | 9/1992 | ............. F16K 17/04 |

* cited by examiner

Comparative Embodiment

PRESSURE REDUCING VALVE

INCORPORATION BY REFERENCE

The disclosure of Japanese Patent Application No. 2014-218497 filed on Oct. 27, 2014 including the specification, drawings and abstract is incorporated herein by reference in its entirety.

BACKGROUND OF THE INVENTION

1. Field of the Invention

The invention relates to a pressure reducing valve.

2. Description of Related Art

Generally, a pressure reducing valve (regulator) includes an on-off valve (poppet) between a primary port into which high-pressure gas flows and a secondary port that supplies gas to the outside. As the on-off valve opens and closes, high-pressure gas flowing from the primary port to the secondary port is reduced in pressure, and is then supplied to the outside.

As such a pressure reducing valve, there is a pressure reducing valve that is used in a fuel cell system. An on-off valve (poppet), which is the pressure reducing valve that is used in the fuel cell system, has a variable throttle portion. High-pressure hydrogen gas flowing from the primary port is rapidly reduced in pressure by causing the hydrogen gas to pass through a flow passage that is narrowed by the variable throttle portion, and then the hydrogen gas is conveyed to the secondary port.

That is, the flow passage through which hydrogen gas flows has such a shape that the flow passage cross-sectional area rapidly narrows at a portion just before the variable throttle portion, and has such a shape that the flow passage cross-sectional area rapidly increases at a portion downstream of a portion at which the flow passage of the variable throttle portion is narrowest.

At these portions that are connected to the variable throttle portion and at which the flow passage cross-sectional area changes, such a change that hydrogen gas rapidly compresses and rapidly expands occurs. For this reason, conventionally, turbulence that causes generation of abnormal noise occurs at the portion at which hydrogen gas expands.

In Japanese Patent Application Publication No. 2013-196053 (JP 2013-196053 A), for the purpose of suppressing generation of the above-described unusual noise due to turbulence, turbulence (vortex flow) that occurs in fluid that has passed between a valve seat and a poppet valve is rectified by a fluid rectifying portion provided at a downstream end of the valve seat.

However, in JP 2013-196053 A, it is required to separately or integrally provide the downstream end of the valve seat with a component that forms the fluid rectifying portion. Therefore, there is such an inconvenience that the number of components increases, the number of assembling man-hours increases or the number of processes for forming the fluid rectifying portion increases. In JP 2013-196053 A, turbulence is rectified by the fluid rectifying portion after the turbulence has occurred, so turbulence itself is not suppressed.

SUMMARY OF THE INVENTION

The invention provides a pressure reducing valve that is able to suppress generation of abnormal noise due to turbulence by suppressing occurrence of turbulence itself.

An aspect of the invention provides a pressure reducing valve. The pressure reducing valve includes a valve chamber that is provided in a housing and into which fluid is introduced; a pressure reducing chamber that is provided in the housing and that communicates with the valve chamber via a valve hole of a valve seat provided between the pressure reducing chamber and the valve chamber; and a valve element that is arranged inside the valve chamber and that is configured to be seated on an inner periphery of the valve hole. When the valve element is open, the pressure reducing valve reduces a pressure of the fluid by causing the fluid to move to the pressure reducing chamber via the valve hole. In the pressure reducing valve, the valve element has a single stage taper portion that is seated on the inner periphery of the valve hole, the inner periphery of the valve hole includes a first area, a second area and a third area in order from an upstream side of a flow direction of the fluid, the first area is provided such that, when the valve element is open, the height of a flow passage defined between the first area and the single stage taper portion of the valve element gradually reduces toward a downstream side of the flow direction, the second area is provided such that the height of a flow passage defined between the second area and the single stage taper portion is constant when the valve element is open and the entire second area contacts the single stage taper portion when the valve element is closed, and the third area is provided such that, when the valve element is open, the height of a flow passage defined between the third area and the single stage taper portion gradually increases toward the downstream side of the flow direction.

With the above configuration, by providing the second area in which the height of the flow passage is constant, that is, the flow passage cross-sectional area is kept constant, between the first area in which the flow passage rapidly narrows and the third area in which the flow passage rapidly expands, occurrence of turbulence at the time of expansion of fluid is suppressed.

When the valve element is closed, the single stage taper portion of the valve element is in surface contact with the second area of the valve hole, so the position and orientation of the valve element are stable, and an uneven flow passage is not formed. Therefore, turbulence does not occur because of an uneven flow passage, or no abnormal noise is generated. Conventionally, the valve element is not brought into surface contact with the valve seat when the valve element is closed, the position and orientation of the valve element can be unstable. In this case, because a flow passage, through which fluid flows although the valve element is closed, is formed, turbulence occurs, and abnormal noise is generated.

The valve seat may be made of an elastically deformable rigid resin. With the above configuration, when the valve element is closed, the second area elastically deforms at the time when the valve element is brought into surface contact with the second area, and the valve element is reliably kept closed.

According to the above aspect, it is possible to suppress generation of abnormal noise due to turbulence by suppressing occurrence of the turbulence itself.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5B shows a schematic half cross-sectional view showing a state where hydrogen gas flows through a valve hole of the valve seat according to the embodiment at the right half view.

DETAILED DESCRIPTION OF EMBODIMENTS

Figure 1:
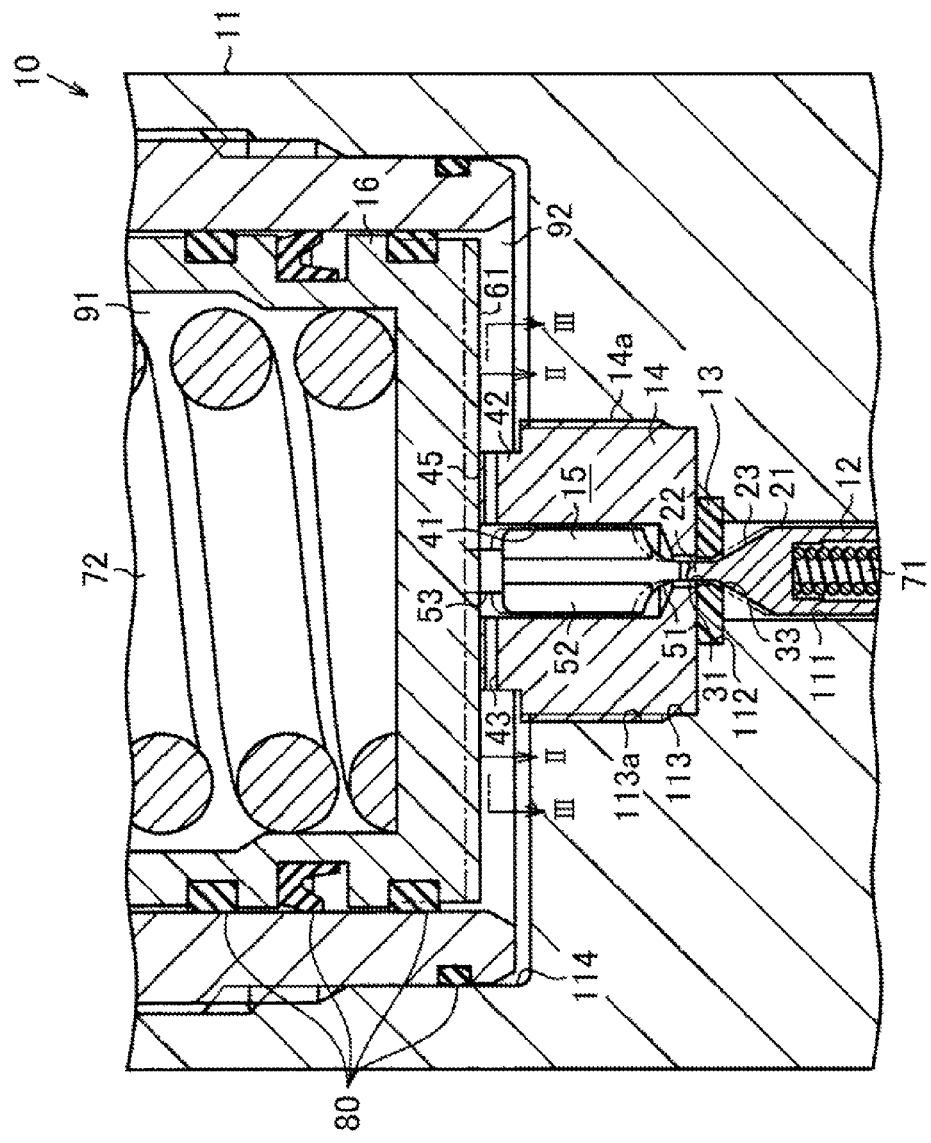
FIG. 1 is a cross-sectional view of a pressure reducing valve according to an embodiment of the invention.

Hereinafter, an embodiment in which the invention is applied to a pressure reducing valve that reduces high-pressure hydrogen gas in pressure will be described with reference to FIG. 1 to FIG. 5. As shown in FIG. 1, the pressure reducing valve 10 includes a housing 11, a valve element 12, a valve seat 13, a valve seat fixing member 14, a valve stem 15, a piston 16, and the like. The housing 11 connects a primary port and a secondary port (both are not shown) with each other. The valve element 12, the valve seat 13, the valve seat fixing member 14, the valve stem 15, the piston 16, and the like, are accommodated in the housing 11.

First to third cylindrical portions 111 to 113 and a cylinder 114 are provided coaxially inside the housing 11 in order from the lower side. The inside diameters of these first to third cylindrical portions 111 to 113 and cylinder 114 are set so as to increase in the stated order. Although not shown in the drawing, the first cylindrical portion 111 is connected to the primary port that is a high-pressure gas supply source (for example, hydrogen tank) via a valve (not shown). The cylinder 114 is connected to the secondary port via an injector (not shown).

The valve element 12 is accommodated in the first cylindrical portion 111. The outside diameter of the valve element 12 is slightly smaller than the inside diameter of the first cylindrical portion 111. The valve element 12 is made of a metal. The first cylindrical portion 111 corresponds to a valve chamber. The valve element 12 is movable up and down inside the first cylindrical portion 111, and is constantly urged upward by a valve spring 71.

The valve element 12 is a poppet-shaped valve, and includes a cylindrical columnar valve element body portion 21, a valve element distal end portion 22 and a single stage taper portion 23. The valve element distal end portion 22 is continuous with the upper portion of the valve element body portion 21. The outside diameter of the valve element distal end portion 22 is smaller than the outside diameter of the valve element body portion 21. The single stage taper portion 23 is provided between the valve element body portion 21 and the valve element distal end portion 22. The single stage taper portion 23 has a taper face between the valve element body portion 21 and the valve element distal end portion 22. The outside diameter of the taper face gradually linearly reduces toward the valve element distal end portion 22. The single stage taper portion 23 constitutes a variable throttle portion. The taper angle of the taper face of the single stage taper portion 23 is set to $2\beta$. The taper angle $2\beta$ will be described later. The valve element distal end portion 22 passes through the second cylindrical portion 112 and extends into the third cylindrical portion 113. That is, the valve element distal end portion 22 is inserted through the inside of a valve hole 31 (described later).

The circular valve seat 13 is accommodated in the second cylindrical portion 112. The valve seat 13 is made of an elastically deformable rigid resin. The rigid resin may be polyimide resin, or the like, and is, for example, Vespel (trademark: DuPont); however, the rigid resin is not limited to these resins. The thickness (vertical length) of the valve seat 13 is slightly larger (longer) than the depth (vertical length) of the second cylindrical portion 112.

Figure 4:
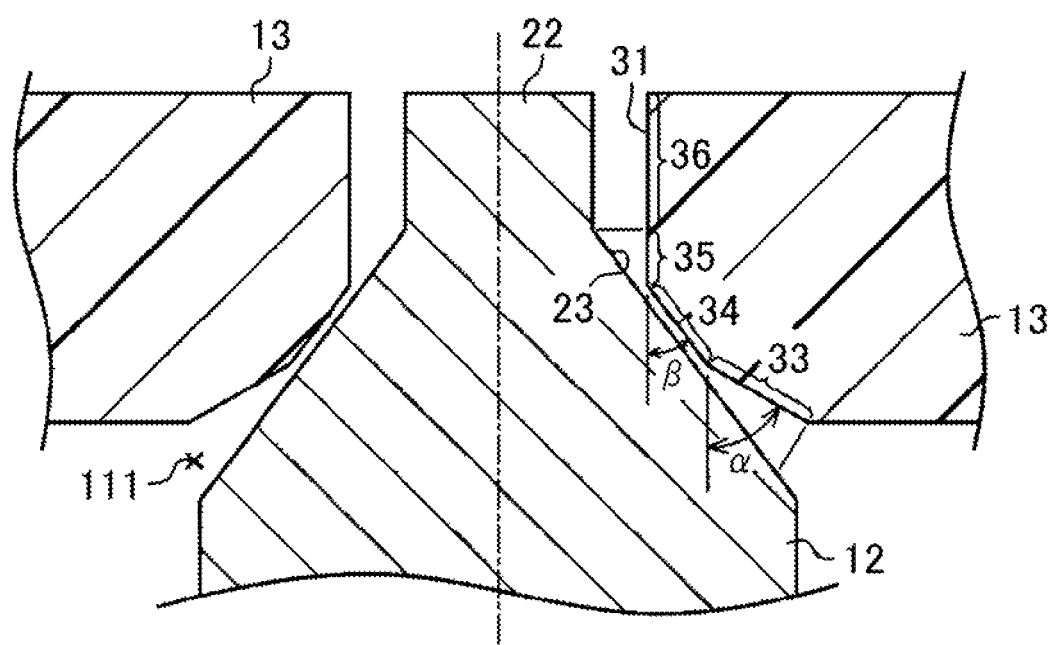
FIG. 4 is a schematic cross-sectional view of a valve seat and a valve element according to the embodiment.

As shown in FIG. 4, the valve hole 31 of the valve seat 13 has a first area 33, a second area 34, a third area 35 and a fourth area 36 in order from the upstream side toward the downstream side in a flow direction of hydrogen gas. FIG. 4 is an enlarged view of the valve hole 31 with part of the components omitted.

The first area 33 has a taper face having a taper angle $2\alpha$ larger than the taper angle $2\beta$ of the single stage taper portion 23 of the valve element 12. As a result, when the valve element 12 is open, the height of a flow passage defined between the first area 33 and the single stage taper portion 23 gradually reduces toward the downstream side of the flow direction. The height of the flow passage means the length of a line, which intersects with the inner periphery of the valve hole 31 at right angles, from the inner periphery of the valve hole 31 to the facing single stage taper portion 23.

The second area 34 has a taper surface having a taper angle $2\beta(<2\alpha)$ smaller than the taper angle of the first area 33. Because the taper angle of the taper surface of the second area 34 is the taper angle $2\beta$ that is the same as the taper angle of the single stage taper portion 23, the entire second area 34 is contactable with part of the face of the single stage taper portion 23 when the valve element 12 is closed. Therefore, when the valve element 12 is open, the height of the flow passage defined between the second area 34 and the single stage taper portion 23 becomes a numeric value based on a valve opening amount (that is, the amount of movement of the valve element at the time of opening from a valve closed state), and is constant in throughout the second area 34.

In the present embodiment, because the valve seat 13 is made of an elastically deformable rigid resin, when the single stage taper portion 23 contacts the second area 34, the second area 34 elastically deforms in a direction in which the second area 34 is pressed in response to the pressing force of the single stage taper portion 23. Thus, a shock at the time of contact of the valve element 12 in closing the valve element is relieved.

The inner peripheries of the third area 35 and fourth area 36 have coaxial circular cross-sectional shapes having equal diameters. The inside diameter of each of the third area 35 and fourth area 36 is slightly larger than the outside diameter of the valve element distal end portion 22. The vertical lengths of the third area 35 and fourth area 36 are variable in response to the valve opening amount of the valve element 12. That is, when the valve element 12 is closed, the third area 35 has the largest vertical length and the fourth area 36 has the smallest vertical length in FIG. 4. In a valve open state where the valve opening amount is maximum, the third area 35 has the smallest vertical length and the fourth area 36 has the largest vertical length in FIG. 4.

The distal end of the single stage taper portion 23 of the valve element 12 has such a size that, when the valve element is closed, the distal end is arranged in a spatial area that is surrounded by the inner peripheries having the circular cross sectional shapes with the same diameters in the valve hole 31. The valve element 12 is arranged such that, when the valve element is open, the height of the flow passage defined between the third area 35 and the single stage taper portion 23 gradually increases toward the downstream side of the flow direction. On the other hand, in the fourth area 36, the height of the flow passage defined between the fourth area 36 and the outer periphery of the valve element distal end portion 22 is uniform over the entire fourth area.

As shown in FIG. 1, a threaded groove 113a is provided on the inner wall of the third cylindrical portion 113. The cylindrical valve seat fixing member 14 in which screw threads 14a are provided on the outer face is screwed to the third cylindrical portion 113. The valve seat fixing member 14 is made of a metal material. The bottom face of the valve seat fixing member 14 contacts the top face of the valve seat 13. As the valve seat fixing member 14 is screwed in, the valve seat 13 is pressed downward. Therefore, the valve seat 13 is sandwiched between the valve seat fixing member 14 and the bottom of the second cylindrical portion 112. Thus, airtightness between the bottom of the second cylindrical portion 112 and the valve seat 13 is ensured.

As indicated by the alternate long and two-short dashes line in FIG. 1, the valve seat 13 may be sandwiched between the valve seat fixing member 14 and the valve element 12 urged by the valve spring 71. In this case, the second area 34 and the single stage taper portion 23 contact each other, and airtightness therebetween is ensured.

The inside of the valve seat fixing member 14, that is, a through hole 41 extending through in the vertical direction, is continuous with the valve hole 31 of the valve seat 13. Thus, the valve element distal end portion 22 extends into the valve seat fixing member 14.

Figure 2:
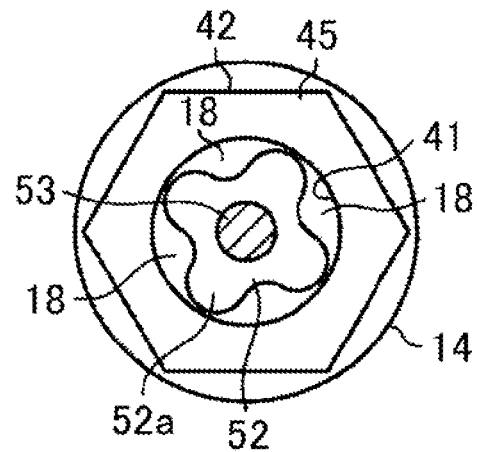
FIG. 2 is a top view taken along the line II-II in FIG. 1.

As shown in FIG. 2, the outer shape of an upper portion 42 of the valve seat fixing member 14 is a hexagonal shape. Thus, the upper portion 42 is engageable with a hexagonal socket (not shown) corresponding to a mounting tool. The valve seat fixing member 14 screwed to the third cylindrical portion 113 when rotated via the hexagonal socket (not shown) that is engaged with the upper portion 42.

Figure 3:
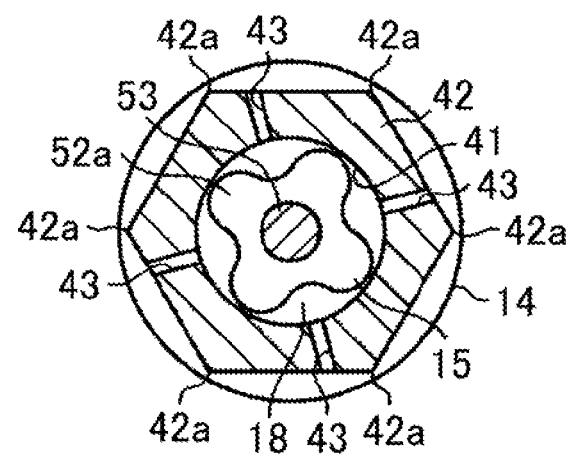
FIG. 3 is a cross-sectional view taken along the line in FIG. 1.

As shown in FIG. 3, the upper portion 42 of the valve seat fixing member 14 has four radially extending flow passage holes 43. The four flow passage holes 43 are provided at equiangular intervals (at intervals of 90°). The four flow passage holes 43 are provided so as to avoid corners 42a of the upper portion 42. Thus, engagement strength at the corners 42a of the upper portion 42 with the hexagonal socket (not shown) is ensured. As shown in FIG. 1, the four flow passage holes 43 connect the through hole 41 with the cylinder 114. As shown in FIG. 2, an upper end face of the valve seat fixing member 14 is a flat even face.

As shown in FIG. 1, the thickness (vertical length) of the valve seat fixing member 14 is larger than the depth (vertical length) of the third cylindrical portion 113. Therefore, the upper portion 42 of the valve seat fixing member 14 extends into the cylinder 114.

As shown in FIG. 1, the valve stem 15 made of a metal is accommodated in the through hole 41. The valve stem 15 includes a truncated cone-shaped valve stem lower end 51, a valve stem body portion 52 continuous with the upper side of the valve stem lower end 51, and a circular columnar valve stem upper end 53 continuous with the upper side of the valve stem body portion 52. The valve stem lower end 51 of the valve stem 15 contacts the valve element distal end portion 22 that extends into the through hole 41. As shown in FIG. 2, the valve stem body portion 52 includes four radially extending blades 52a. The four blades 52a are provided at equiangular intervals (at intervals of 90°). Four spaces each surrounded by the adjacent blades 52a and the inner wall of the valve seat fixing member 14 function as flow passages 18.

As indicated by the alternate long and two-short dashes line in FIG. 1, in the valve closed state where the single stage taper portion 23 is in contact with the second area 34, the valve stem upper end 53 protrudes from the upper portion of the valve seat fixing member 14, and extends into the cylinder 114.

As shown in FIG. 1, the piston 16 is accommodated in the cylinder 114 so as to be movable up and down. The piston 16 is formed in a cylindrical shape, and is made of a metal material. Various seal members 80 are interposed between the inner wall of the cylinder 114 and the piston 16. Airtightness between the inner wall of the cylinder 114 and the piston 16 is ensured by the seal members 80. The inside of the cylinder 114 is partitioned into two spaces by the piston 16. The space provided on the upper side of the piston 16 serves as a pressure regulating chamber 91. The space provided on the lower side of the piston 16 serves as a pressure reducing chamber 92.

The piston 16 is constantly urged downward by a piston spring 72 accommodated inside the piston 16. The urging force of the piston spring 72 is set so as to be stronger than the urging force of the valve spring 71. Thus, a lower end face 61 of the piston 16 is constantly in contact with the valve stem upper end 53. The lower end face 61 of the piston 16 is a flat even face. The diameter of the lower end face 61 of the piston 16 is set so as to be larger than the outside diameter of an upper end face 45 of the valve seat fixing member 14. The lower end face 61 of the piston 16 is contactable with the upper end face 45 of the valve seat fixing member 14. Therefore, a downward displacement of the piston 16 is restricted by the contact of the lower end face 61 with the upper end face 45 of the valve seat fixing member 14.

As indicated by the continuous line in FIG. 1, when the lower end face 61 of the piston 16 contacts the upper end face 45 of the valve seat fixing member 14, the single stage taper portion 23 and the second area 34 are spaced apart from each other. That is, the valve element 12 is fully open, and the valve opening amount is maximum.

As the piston 16 is displaced upward from the valve open state where the valve element 12 is fully open, the single stage taper portion 23 and the second area 34 approach each other. As indicated by the alternate long and two-short dashes line in FIG. 1, when the lower end face 61 of the piston 16 and the upper end face 45 of the valve seat fixing member 14 are spaced apart from each other, the single stage taper portion 23 and the second area 34 contact each other. Thus, the valve element 12 is closed.

The operation of the thus configured pressure reducing valve 10 will be described. The urging force of the piston spring 72 acts on the piston 16 in a direction from the pressure regulating chamber 91 toward the pressure reducing chamber 92. The urging force of the valve spring 71 having a smaller urging force than the urging force of the piston spring 72 acts on the piston 16 in a direction from the pressure reducing chamber 92 toward the pressure regulating chamber 91.

For the sake of convenience of description, description will begin from a state where the piston 16 is located such that the valve element 12 is fully open, that is, the piston 16 is located such that the lower end face 61 of the piston 16 contacts the upper end face 45 of the valve seat fixing member 14.

Initially, the flow of gas in the pressure reducing valve 10 and the operations of the valve element 12 and piston 16 will be roughly described. When high-pressure gas is supplied to the pressure reducing valve 10, the high-pressure gas is reduced in pressure in process in which the high-pressure gas passes through the first cylindrical portion 111 (valve chamber), the fully open valve element 12, the inside of the valve seat fixing member 14 (accurately, the through hole 41) and the flow passage holes 43 and is introduced into the pressure reducing chamber 92, and then the gas is supplied to the secondary port. Thus, the piston 16 is pressed in a direction from the pressure reducing chamber 92 toward the pressure regulating chamber 91 by the pressure of gas introduced into the pressure reducing chamber 92. That is, the piston 16 is displaced on the basis of the magnitude relation between the urging force of the piston spring 72 and the sum of the pressing force based on the pressure of gas and the urging force of the valve spring 71.

More specifically, when the urging force of the piston spring 72 is smaller than the sum of the pressing force based on the pressure of gas and the urging force of the valve spring 71, the piston 16 is displaced upward (toward the pressure regulating chamber 91). Thus, the valve stem 15 and the valve element 12 are displaced upward, the single stage taper portion 23 of the valve element 12 shown in FIG. 4 contacts the taper surface of the second area 34, and then the valve element 12 is closed.

Figure 6:
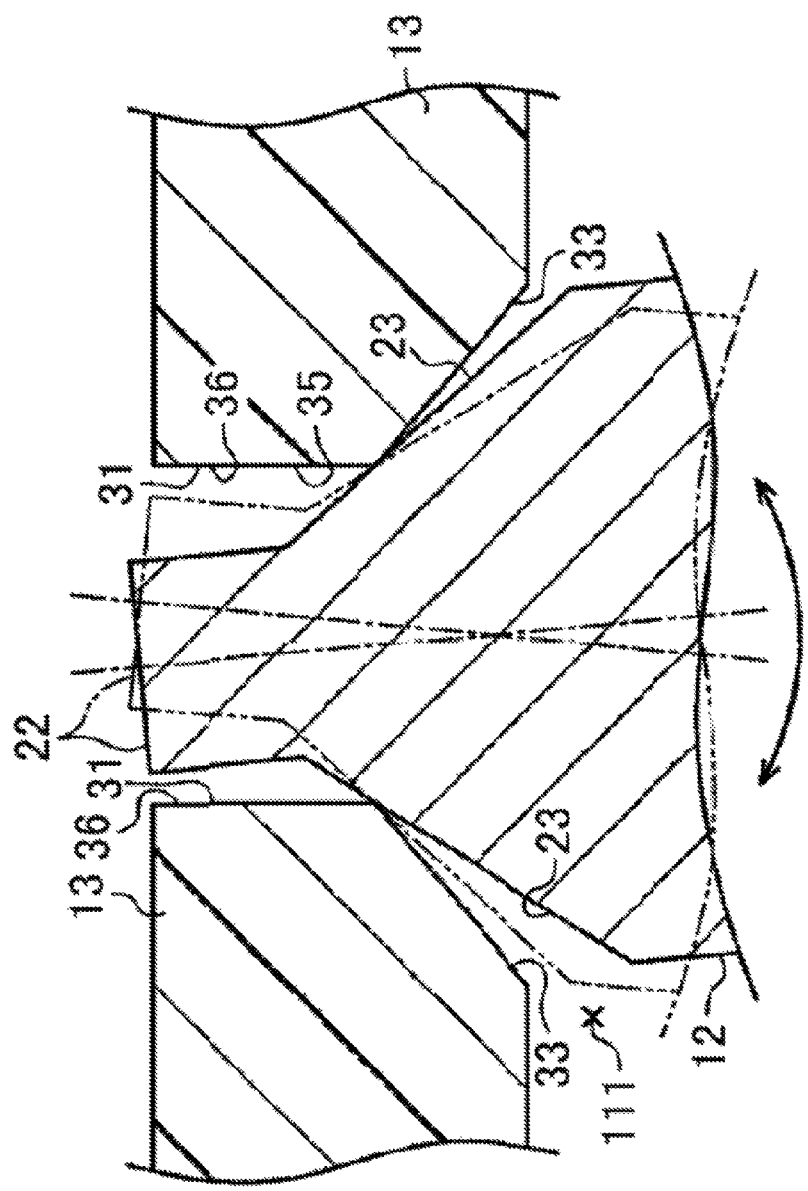
FIG. 6 is a cross-sectional view of the valve seat and valve element of a pressure reducing valve according to the comparative embodiment.

When the valve element is closed, the taper surface of the single stage taper portion 23 of the valve element 12 is brought into surface contact with the taper surface of the second area 34, so centering is easy. FIG. 6 shows a comparative embodiment. In the comparative embodiment shown in FIG. 6, the second area 34 is omitted, and the third area 35 and the fourth area 36 are provided downstream of the first area 33. In the comparative embodiment, because the taper angle 2β of the single stage taper portion 23 is smaller than the taper angle 2α of the first area 33, the single stage taper portion 23 is brought into line contact with a ridge line between the first area 33 and the third area 35 when the valve element is closed, as shown in FIG. 6. As a result, in the comparative embodiment, there is an inconvenience that the position and orientation of the valve element 12 become instable because of the line contact. In the present embodiment, because the valve element 12 is brought into surface contact with the valve seat 13 as described above, the position of the valve element 12 does not become instable.

Because the valve seat 13 is made of an elastically deformable rigid resin, when the single stage taper portion 23 contacts the second area 34, the second area 34 elastically deforms in a receding direction in response to the pressing force of the single stage taper portion 23 to relieve a shock at the time of contact with the valve element 12 when the valve element is closed.

On the other hand, when the urging force of the piston spring 72 is larger than the sum of the pressing force based on the pressure of gas and the urging force of the valve spring 71, the piston 16 is displaced downward (toward the pressure reducing chamber 92). Thus, the valve stem 15 and the valve element 12 are displaced downward, the single stage taper portion 23 of the valve element 12 moves away from the taper surface of the second area 34, and then the valve element 12 is opened.

Next, the flow state of gas in the flow passage between the valve element 12 and the valve hole 31 in a state where the valve element 12 is open will be described below. As shown in the right half view of FIG. 5B, when the valve element 12 is open, gas passes through the flow passage defined between the taper surface of the single stage taper portion 23 of the valve element 12 and the taper surface of the first area 33. In this flow passage, the height of the flow passage gradually reduces toward the downstream side of the flow direction, so gas is compressed. The compressed gas passes through the flow passage defined between the taper surface of the single stage taper portion 23 of the valve element 12 and the taper surface of the second area 34. In this flow passage, the height of the flow passage is constant over the entire second area 34. Therefore, in this flow passage, gas is kept in the same compressed state, that is, gas moves to the downstream third area 35 in a state where occurrence of turbulence of gas is suppressed. Subsequently, the compressed gas enters the flow passage defined between the single stage taper portion 23 of the valve element 12 and the third area 35. The height of this flow passage gradually increases toward the downstream side of the flow direction. Therefore, gas entering this flow passage expands, and moves through the flow passage defined between the fourth area 36 and the outer periphery of the valve element distal end portion 22.

Figure 5B:
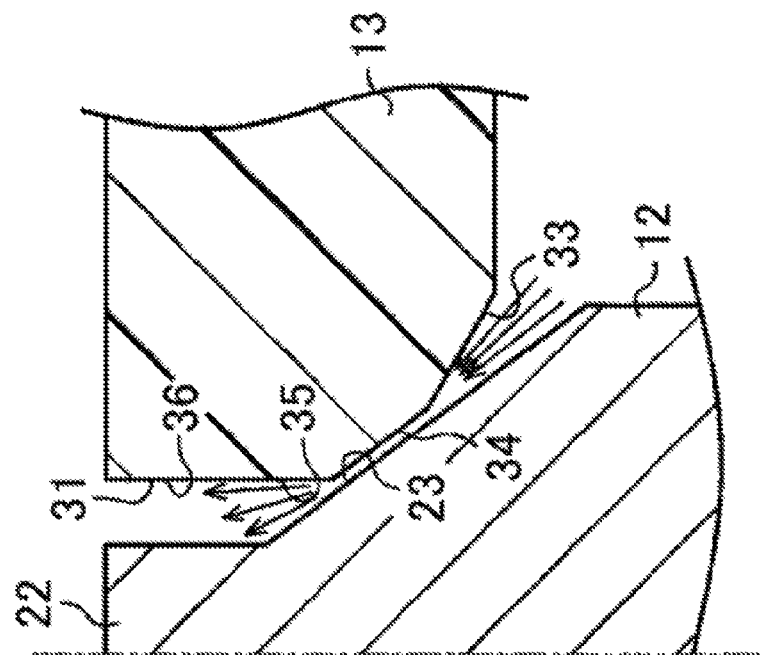
FIGS. 5A and 5B show a schematic half cross-sectional view of the valve seat and the valve element, FIG. 5A showing a state where hydrogen gas passes through a valve hole of the valve seat according to a comparative embodiment at the left half view.
Figure 5A:
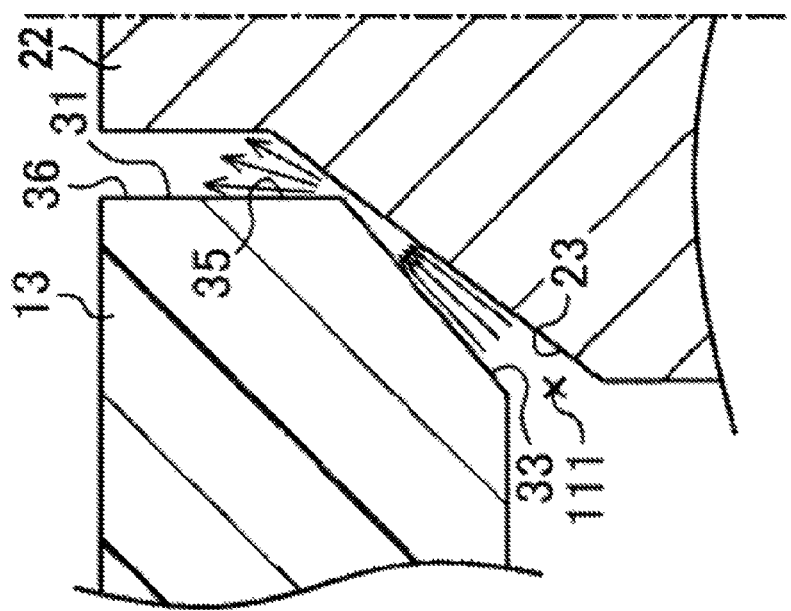

FIG. 5A shows a comparative embodiment at the left half view. In the comparative embodiment illustrated in FIG. 5A, like reference numerals denote components corresponding to those of the above-described embodiment. In the comparative embodiment of FIG. 5A, the second area 34 is omitted, and the third area 35 and the fourth area 36 are provided downstream of the first area 33. In this comparative embodiment, when the valve is open, gas compressed in the flow passage between the first area 33 and the single stage taper portion 23 rapidly expands in the flow passage between the third area 35 and the single stage taper portion 23, so turbulence occurs, with the result that abnormal noise is generated because of the turbulence.

Referring back to the present embodiment, when supply of gas to the pressure reducing valve 10 is stopped, the urging force of the piston spring 72 becomes larger than the sum of the pressing force based on the pressure of gas and the urging force of the valve spring 71, so the piston 16 is displaced downward (toward the pressure reducing chamber 92). Finally, the lower end face 61 of the piston 16 and the upper end face 45 of the valve seat fixing member 14 contact each other. These lower end face 61 of the piston 16 and upper end face 45 of the valve seat fixing member 14 each are an even face, so the contact is a so-called surface contact by which surfaces collide with each other. Because of the surface contact, a shock of the contact is dispersed to all the surface.

As described in detail above, according to the present embodiment, the following advantageous effects are obtained.

(1) In the pressure reducing valve 10 according to the present embodiment, the valve element 12 includes the single stage taper portion 23 that is seated on the inner periphery of the valve hole 31. The inner periphery of the valve hole 31 has the first area 33, the second area 34 and the third area 35 in order from the upstream side of the flow direction of the fluid. The first area 33 is provided such that, when the valve element is open, the height of the flow passage defined between the first area 33 and the single stage taper portion 23 of the valve element 12 gradually reduces toward the downstream side of the flow direction. The second area 34 is provided such that the height of the flow passage is constant when the valve element is open and the entire area contacts the single stage taper portion when the valve element is closed. The third area 35 is provided such that, when the valve element is open, the height of the flow passage gradually increases toward the downstream side of the flow direction. As a result, according to the present embodiment, it is possible to suppress generation of abnormal noise due to turbulence by suppressing occurrence of the turbulence itself.

When the valve element is closed, because the taper surface of the single stage taper portion 23 of the valve element 12 is brought into surface contact with the taper surface of the second area 34, centering is easy. As a result, the position and orientation of the valve element 12 when the valve element is closed does not become unstable, an uneven flow passage just after the valve element is opened does not occur, and abnormal noise due to turbulence is not generated.

(2) In the pressure reducing valve 10 according to the present embodiment, the valve seat 13 is made of an elastically deformable rigid resin. As a result, according to the present embodiment, at the time of contact of the single stage taper portion 23 with the second area 34 when the valve element is closed, the second area 34 elastically deforms in a receding direction in response to the pressing force of the single stage taper portion 23. Thus, a shock at the time of contact of the valve element 12 in closing the valve element is relieved.

The above-described embodiment may be modified as follows. In the embodiment, the valve element has a poppet shape. Instead, the valve element may be a needle valve. Gas that the pressure reducing valve according to the above-described embodiment reduces in pressure is hydrogen. Instead, for example, the gas may be gas other than hydrogen, such as oxygen and nitrogen. The number of chemical elements that compose gas is not limited to one. That is, gas that is reduced in pressure may be composed of a plurality of chemical elements.

Fluid other than gas, such as vapor, or liquid, such as water and oil, may be used.

What is claimed is:

1. A pressure reducing valve comprising:
    a valve chamber that is provided in a housing and into which fluid is introduced;
    a pressure reducing chamber that is provided in the housing and that communicates with the valve chamber via a valve hole formed in a valve seat provided between the pressure reducing chamber and the valve chamber; and
    a valve element that is arranged inside the valve chamber and that is configured to be seated on an inner peripheral surface of the valve seat that delimits the valve hole, wherein
    when the valve element is open, the pressure reducing valve reduces a pressure of the fluid by causing the fluid to move to the pressure reducing chamber via the valve hole,
    the valve element has a single stage taper portion configured to be seated on the inner peripheral surface delimiting the valve hole,
    the inner peripheral surface delimiting the valve hole includes a first area, a second area, and a third area in order from an upstream side of a flow direction of the fluid,
    the first area is provided such that, when the valve element is open, a height of a flow passage defined between the first area and the single stage taper portion of the valve element gradually reduces toward a downstream side of the flow direction, the first area delimits a portion of the valve hole and does not include an upstream-most face of the valve seat in the flow direction of the fluid,
    the second area is provided such that a height of a flow passage defined between the second area and the single stage taper portion is constant when the valve element is open and the entire second area contacts the single stage taper portion when the valve element is closed, and
    the third area is provided such that, when the valve element is open, a height of a flow passage defined between the third area and the single stage taper portion gradually increases toward the downstream side of the flow direction.

2. The pressure reducing valve according to claim 1, wherein the valve seat is made of an elastically deformable rigid resin.

3. The pressure reducing valve according to claim 1, wherein
    a taper angle of the single stage taper portion is equal to a taper angle of a taper surface of the second area, and
    the taper angle of the taper surface of the second area is smaller than a taper angle of a taper surface of the first area.

* * * * *